United States Patent
Kobayashi

[11] Patent Number: 6,071,465
[45] Date of Patent: Jun. 6, 2000

[54] BONDED ARTICLES AND A PROCESS FOR PRODUCING THE SAME

[75] Inventor: Hiromichi Kobayashi, Yokkaichi, Japan

[73] Assignee: NGK Insulators, Ltd., Japan

[21] Appl. No.: 08/957,067

[22] Filed: Oct. 24, 1997

Related U.S. Application Data

[62] Division of application No. 08/487,690, Jun. 7, 1995, Pat. No. 5,721,062.

[30] Foreign Application Priority Data

Sep. 1, 1994 [JP] Japan ..................................... 6-230213

[51] Int. Cl.[7] ...................................................... B32B 9/00
[52] U.S. Cl. ........................... 264/605; 264/624; 264/681; 264/682; 264/683
[58] Field of Search .................................. 264/605, 624, 264/681, 682, 683

[56] References Cited

U.S. PATENT DOCUMENTS

| | | | |
|---|---|---|---|
| 4,960,736 | 10/1990 | Luxzcz | 501/127 |
| 5,240,171 | 8/1993 | Newkirk | 228/198 |
| 5,306,895 | 4/1994 | Ushikoshi | 219/385 |
| 5,721,062 | 2/1998 | Kobayashi | 428/688 |

FOREIGN PATENT DOCUMENTS

| | | |
|---|---|---|
| 55-162485 | 12/1980 | Japan . |
| 3-215370 | 8/1991 | Japan . |
| 5-4876 | 1/1993 | Japan . |

OTHER PUBLICATIONS

Yogo Kyokaishi, vol. 91, No. 11, 1983, Japan, pp. 520–522, S. Kanzaki et al.: "Diffusion joining of silicon nitride ceramics", p. 522.

Chemical Abstracts, vol. 82, No. 22, Jun. 2, 1975, Columbus, Ohio, US; Abstract No. 144178, A. Tsumie et al.: "Adhering heat-resistant, reinforced composite materials".

*Primary Examiner*—Timothy M. Speer
*Attorney, Agent, or Firm*—Parkhurst & Wendell, L.L.P.

[57] ABSTRACT

A process for producing a bonded article of ceramic bodies comprising steps of: machining the ceramic bodies to be bonded to form machined surfaces with average surface roughnesses (Ra) of not more than 0.2 $\mu$m and flatnesses of not more than 0.2 $\mu$m; applying solution containing a bonding aid on at least one of the machined surfaces; contacting the machined surfaces with each other to produce an assembly; and subjecting the assembly to a heat treatment to produce the bonded article. The roughnesses and the flatnesses may preferably be not more than 0.1 $\mu$m. The bonding aid may preferably be a sintering aid applicable to at least one of the ceramic bodies. The ceramic bodies may preferably be one or more material selected from a group consisting of aluminum nitride and silicon nitride. The bonding aid may preferably be one or more bonding aid selected from a group consisting of a substance of yttrium and a substance of ytterbium. In the article, a layer rich in elements contained in a bonding aid is formed along the bonding interface of the article and ceramic particles are grown across the bonding interface.

15 Claims, 8 Drawing Sheets

FIG_1a

FIG_1b

FIG_1c

FIG_2a

FIG_2b

FIG_8

FIG. 10

BONDED ARTICLES AND A PROCESS FOR PRODUCING THE SAME

This is a Division of application Ser. No. 08/487,690 filed Jun. 7, 1995 now U.S. Pat. No. 5,721,062.

BACKGROUND OF THE INVENTION

1. Field of the invention

The present invention relates to a process for solid-phase bonding ceramic bodies and the thus produced bonded articles.

2. Description of the Related Art

The present inventor disclosed a ceramic heater as described below as a heating apparatus for use in a thermal CVD apparatus for producing semiconductors, for example in a specification of Japanese patent application 301,897/1991. For producing such ceramic heaters, it is necessary to bond a disk shaped base made of silicon nitride sintered body having a heat resistor made of tungsten therein and a tube shaped body made of silicon nitride for preventing the leakage of a corrosive gas or a gas for forming semiconductor films. However, the inventor found it difficult to form strong and gas-tight bonding between the base and the tube shaped body. For example, the inventor tried to bond the disk shaped base and the tube shaped body to obtain the heating apparatus (a bonded article) using a glass adhesive made of an oxide glass. However, a mechanical strength of the bonding interface of the bonded article was low. Moreover, when such heating apparatus was placed in an apparatus for producing semiconductors and the gas for forming semiconductor films or the corrosive gas was supplied and flowed into the semiconductor producing apparatus, gas leakage may occur at the bonding interface of the base and the tube shaped body. Additionally, cracks may occur along the bonding interface when using the heating apparatus repeatedly.

As described above, the inventor conducted intensive research for producing a bonded article of ceramic bodies made of silicon nitride or aluminum nitride with a high mechanical strength. However, because of several reasons including high sintering temperatures of the ceramic bodies, the inventor failed to find an appropriate process for such bonding in prior art processes. For example, the inventor tried to apply a powdery bonding agent between the ceramic bodies which is then heated to diffuse ingredients of the powdery bonding agent. However, it was difficult to produce the bonded article with a high mechanical strength and gas-tight performance at the bonding interface.

SUMMARY OF THE INVENTION

It is an object of the invention to provide a novel process for bonding ceramic bodies.

It is another object of the invention to improve mechanical strength of a bonded article over that of a bonded article produced by prior process, when bonding the ceramic bodies to provide the article.

It is another object of the invention to improve mechanical strength at the bonding interface to be comparable to mechanical strength at a position other than the bonding interface of the bonded article.

It is another object of the invention to improve gas tightness of the bonding interface to prevent gas leakage therefrom and to prevent cracks occurring along the bonding interface.

The present invention provides a bonded article of ceramic bodies bonded by a solid phase bonding process, wherein a layer rich in elements of a bonding aid is formed along a bonding interface of said bonded article and ceramic particles are grown across said bonding interface.

The present invention also provides a process for producing a bonded article of ceramic bodies bonded by a solid phase bonding process comprising steps of:

machining said ceramic bodies to be bonded to form machined surfaces with average surface roughnesses (Ra) of not more than 0.2 $\mu$m and flatnesses of not more than 0.2 $\mu$m;

applying a solution containing a bonding aid on at least one of said machined surfaces;

contacting said machined surfaces with each other to produce an assembly;

and subjecting said assembly to a heat treatment to produce said bonded article.

The inventors prepared elongate samples made of silicon nitride or aluminum nitride, subjected a surface of each sample to a super-accurate machining process to form an accurately machined surface, and applied solution containing a bonding aid on each machined surface. After that, the machined surfaces were contacted with each other to provide an assembly, which was then subjected to a heat treatment to provide a bonded article. The inventors, then measured a four point strength of the thus obtained article. Surprisingly, the four point strength of the bonded article was proved to be comparable with that of a sintered body made of the same material with same dimensions. Additionally, during the process of measuring the four point strength, the fracture of the article did not occur along the bonding interface and each of the sintered ceramic bodies was fractured therein. That is, the inventors found and confirmed the surprising effect that the mechanical strength at the bonding interface was comparable or even larger than that of the sintered ceramic body itself, and attained the invention.

These and other objects, features and advantages of the invention will be appreciated upon reading the following description of the invention when taken in conjunction with the attached drawings, with the understanding that some modifications, variations and changes of the same could be made by the skilled person in the art.

BRIEF DESCRIPTION OF THE DRAWINGS

For a better understanding of the invention, reference is made to the attached drawings, wherein:

FIG. 1(*a*) is a front view of ceramic bodies 1A and 1B before contacting them;

FIG. 1(*b*) is a front view of the ceramic bodies 1A and 1B contacting with each other;

FIG. 1(*c*) is a front view of a bonded body 3 of the ceramic bodies 1A and 1B;

FIG. 2(*a*) is a cross sectional view schematically showing a region near machined surfaces of the ceramic bodies, wherein a solution containing a bonding aid is applied between the machined surfaces;

FIG. 2(*b*) is a cross sectional view schematically showing a region near a bonding interface 4 after a heat treatment of the ceramic bodies contacted with each other;

DETAILED EXPLANATION OF THE INVENTION

The present invention will now be explained below referring to preferred embodiments shown in the figures.

Figure 1A:
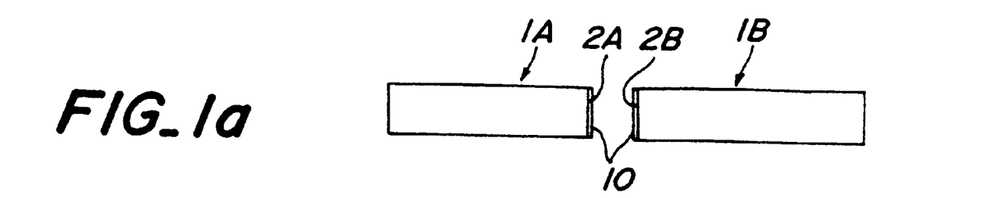
Figure 1B:
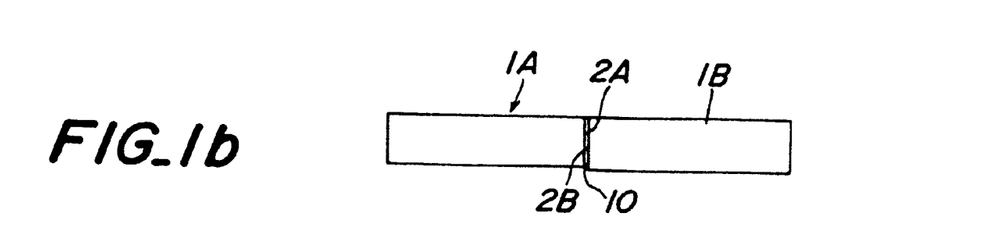

As for example, as schematically shown in FIG. 1(a), ceramic bodies 1A and 1B for use in a four point bending strength test with a predetermined shape and dimensions were prepared. A surface 2A of the ceramic body 1A and a surface 2B of the ceramic body 2B were subjected to a super-accurate machining process. After the process, it is necessary to provide the surface 2A and 2B with an average surface roughness (Ra) of not more than 0.2 μm and a flatness of not more than 0.2 μm. Solution 10 containing a bonding aid was then applied on the machined surface 2A and/or 2B. In the example shown in FIG. 1(a), the solution 10 was applied on both machined surface 2A and 2B. The machined surfaces 2A and 2B were then contacted with substantially no clearance as shown in FIG. 1(b).

Figure 2A:
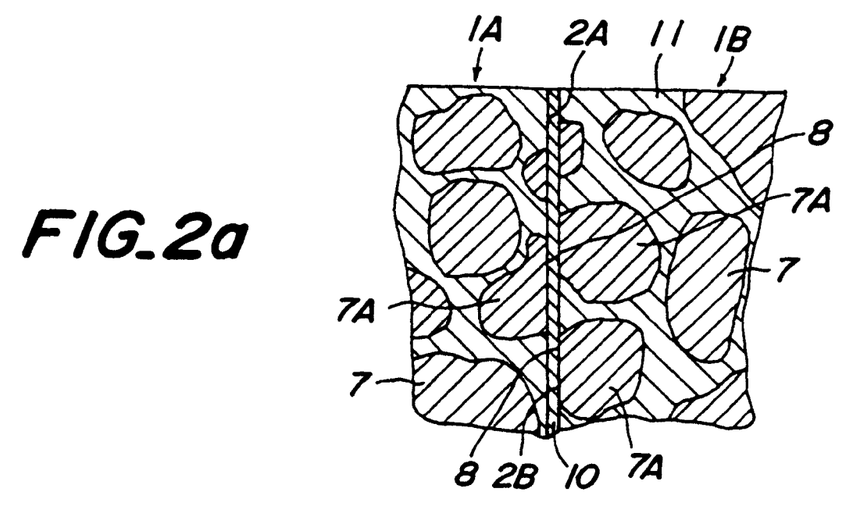

FIG. 2(a) is an enlarged cross sectional view schematically showing a region near a bonding interface at that stage. That is, the microstructure of each ceramic body 1A and 1B has a polycrystal structure, in which intergranular phases 11 are formed between ceramic particles or crystal particles 7. Ceramic particles 7A across the bonding interface are cut during the above machining process and cutting surfaces of the particles 7A expose on the machined surface 2A and 2B. When contacting the surfaces 2A and 2B, the cutting surfaces of the particles are contacted with each other with substantially no clearance by machining each surface 2A and 2B, as described above.

Figure 2B:
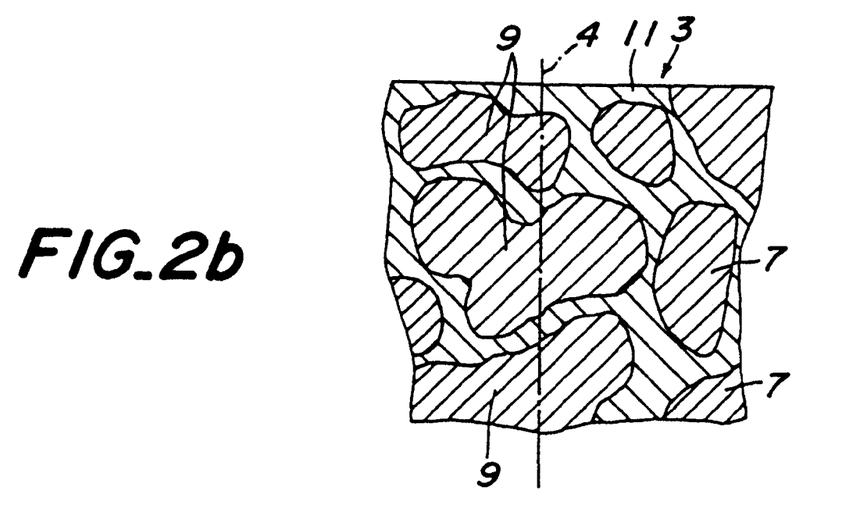

The solution 10 is applied between the surfaces 2A and 2B to provide an assembly, which is then subjected to a heat treatment. During the heat treatment, the particles 7A contained in the ceramic body 1A and 1B were contacted and bonded with each other according to the diffusion of the bonding aid or agent in each particle 7A. The particles are bonded and grown as shown in FIG. 2(b) to form bonded particles 9, which grow across the bonding interface 4 and extend in the direction perpendicular to the interface 4.

Figure 3:
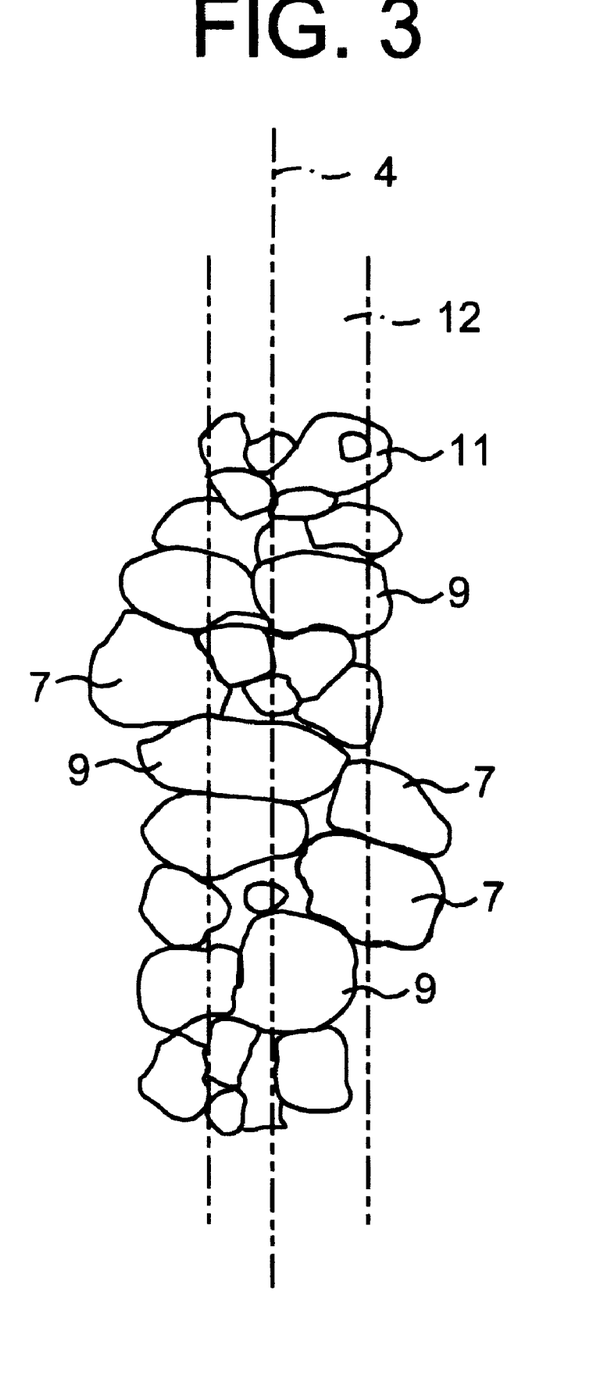
FIG. 3 is a view schematically showing a region near the bonding interface 4 after the heat treatment, in which a layer 12 rich in the bonding aid is formed and the aid is moved by the growth of ceramic particles 9 across the interface 4.

As described above, the invention provides a novel process that the cut particles 7A are contacted with substantially no clearance, bonded with each other and then grown across the bonding interface using the effect of the bonding aid, during the heat treatment. Consequently, for example, as shown in FIG. 3, a layer 12 rich in the bonding aid is formed along the bonding interface, and the bonded particles 9 occur and grow mainly in the layer 12 towards the direction perpendicular to the bonding interface. During that process, intergranular phases containing a great portion of the bonding aid is then dispersed as the growth of the bonded particles 9. The layer 12 may be clearly observed and confirmed by means of an electromicroscope.

When the average surface roughness is larger than 0.2 μm, the cut particles 7A may not be bonded with each other, probably because a small clearance occurs between the contacted particles 7A. Moreover, when the flatness of the machined surface is larger than 0.2 μm, the particles 7A may not be bonded with each other, probably because the machined surfaces are contacted with each other leaving some clearance. Moreover, it is indispensable to dissolve the bonding aid in the solution. When using dispersion or slurry containing particles of the bonding aid, it was impossible to bond the ceramic bodies with each other with a high strength.

Besides, the average surface roughness (Ra) is calculated as follows. A cross-sectional surface curve is measured and a center line of the curve is drawn. Thus, a sum of areas of regions encompassed by the curve and the center line is divided by a length "L" of the center line to provide the roughness. The flatness is a deviation of the surface interface from an ideal or geometrical interface. JIS defines the flatness as a distance of two geometrical interface which are parallel to each other, when the surface interface is sandwiched with the geometrical interfaces and the geometrical interfaces are placed so that the distance is made minimized. The surface roughness and the flatness may be measured with a device for measuring a surface roughness and a laser interferometer.

The average surface roughness of the machined surface may preferably be not more than 0.1 μm and the flatness may preferably be not more than 0.1 μm. These values may preferably be as small as possible for forming the bonding with a higher strength and gas-tight performance and thus the definition of the minimum values is not needed. However, because of the upper limit of the accuracy of machining process of ceramics at the time the application was filed, the lower limit of the roughness was 0.05 μm and that of the flatness was 0.07 μm.

The surface of the ceramic body may preferably be machined with a surface grinder and a lapping machine for producing the surface with the flatness and the surface roughness of the above predetermined values.

Each ceramic body may preferably be subjected to the heat treatment at a temperature not lower than that at which the ceramic particles in the body start to grow, for growing the ceramic particles across the bonding interface perpendicular to the interface.

Such growth of the particles may occur to some extent at a relatively low temperature. However, when a sintering temperature of the ceramic body is taken as "T", it is preferable to carry out the heat treatment at a temperature not lower than "T−50"° C. for further improving the bonding strength. The inventors confirmed that the thus produced bonded body has a strength comparable with a strength of a sintered body of the substantially same material and dimensions.

Figure 1C:
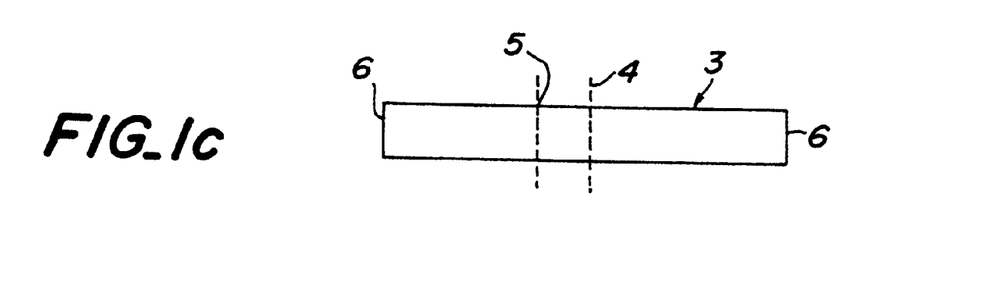

Moreover, when the thus produced bonded body is subjected to a fracture test or a strength test, it was confirmed that the bonded body fractured along an interface other than the bonding interface. For example, as shown in FIG. 1(c), when a power is applied on the bonded body 3, the fracture occurs along a fracture interface in a sintered body other than the bonding interface and does not occur along the bonding interface 4. That is, the strength of microstructure formed along the bonding interface 4 is comparable with that of the sintered body.

When the temperature of the heat treatment is not higher than the sintering temperature, the strength of the bonded body may be made maximized. When the temperature of the treatment is higher than the sintering temperature, during the particle growth along the bonding interface is sufficiently progressed, extraordinary particle growth may occur in the sintered body itself at the same time. Such extraordinary particle growth may cause defects, which may degrade the strength of the sintered body itself. From this viewpoint, when the sintering temperature of the ceramic body is taken as "T", the temperature of the heat treatment may preferably be not higher than "T+50"° C.

Besides, the bonding aid may preferably be a sintering aid or agent applicable to the sintering process of the ceramic body, and more preferably be same as the sintering aid actually used.

When the ceramic particles 7 are made of aluminum nitride or silicon nitride, the bonding aid may preferably be one or more compound selected from the group consisting of a compound containing yttrium and a compound containing ytterbium, and most preferably be a compound containing yttrium. By applying such bonding aid, it was confirmed that the bonding strength was conspicuously improved. When using the compound of yttrium as the bonding aid, the following aids may preferably be used: aqueous solution of yttrium chloride, yttrium chloride hydrate, yttrium sulfate, or yttrium acetate; ethyl alcohol solution of yttrium chloride, yttrium chloride hydrate, or yttrium acetate.

Particularly when the invention is applied to a heating apparatus used for producing semiconductors, alkali metals and alkali earth metals such as K, Na, Ca etc., are considered as the impurities or sources or contamination, so that the bonding aids containing such metals are not preferable. Therefore, the bonding aid may preferably be one or more compound selected from the group consisting of a compound containing yttrium and a compound containing ytterbium, and most preferably be a compound containing yttrium.

According to the invention, the ceramic bodies may be strongly bonded without applying a load on the bodies to be bonded. However, the load may be applied. An actual process for carrying out the heat treatment may be a heat treatment at an ambient temperature, a hot press process, a plasma activating process, a selective heating process using laser etc. A time period of the heat treatment may be varied depending on the size of the ceramic body or the temperature of the heat treatment.

DESCRIPTION OF THE PREFERRED EMBODIMENTS

The actual experiments will be described below.

[Experiment A]

Samples each having a weight of 53 grams and sizes of 20 mm×40 mm×20 mm were prepared as ceramic body samples. The samples were made of aluminum nitride. The samples were sintered at 1900° C. Additionally, a four point bending strength at a room temperature of each sample was about 400 MPa.

Surfaces of the samples were machined using a surface grinder and a high speed lapping machine to form machined surfaces with a average surface roughness of 0.1 μm and a flatnesses of 0.1 μm. Aqueous solution of yttrium nitrate hydrate:$Y(NO_3)_2 \cdot 6H_2O$ with a concentration of yttrium of $2.61 \times 10^{-4}$ mol/cc was prepared and applied on each machined surface of each sample to provide an assembly, which was then subjected to a heat treatment for 1 hour at each temperature shown in FIG. 1. During the heat treatment, each sample was held and fixed in a predetermined position by a fixer so that the positions of the samples did not largely change during the treatment. In the treatment, pressure or a load was not applied on the sample and only their own loads were applied. Nitrogen gas was introduced as the atmospheric gas during the treatment.

In the Table 1, experiment A6, a powdery bonding aid made of yttrium oxide was applied between the surfaces of the samples. In Table 1, ultrasonic flaw defect test was carried out to the bonded interfaces under the condition as follows: the sizes of the bonded body were 20 mm×40 mm×20 mm, a probe frequency was 25 MHz, a probe diameter was 0.25 seconds and a focal distance was 4 seconds. When defects were found, it was indicated "defective" in the Table 1. The four point bending strength was measured according to "JIS R 1601" and the bonding interface was placed in the central region of the inner span in the perpendicular direction. The strengths at 600° C. and a room temperature were measured. These results were shown in Table 1.

TABLE 1

| | Substance between machined surfaces | Temperature of heat treatment (° C.) | Result of ultrasonic flaw detect test | Four point bending strength MPa | | Position of the fracture |
|---|---|---|---|---|---|---|
| | | | | room temperature | 600° C. | |
| Experiment A1 | aqueous solution | 1850 | excellent | 330 | 300 | bonding interface |
| Experiment A2 | aqueous solution | 1900 | excellent | 400 | 370 | the other part |
| Experiment A3 | aqueous solution | 1950 | excellent | 370 | 350 | the other part |
| Experiment A4 | aqueous solution | 1800 | defective | — | — | — |
| Experiment A5 | aqueous solution | 2000 | excellent | 100 | — | the other part |
| Experiment A6 | powdery bonding aid | 1900 | defective | — | — | — |

In the experiments A1, A2 and A3, the defects were not found and the four point bending strengths were considerably improved. Particularly, as shown in the experiment A2, when the bodies were bonded at 1900° C., the bending strength was made 400 MPa, which was substantially same as that of the used sample. Moreover, the bonded article did not fracture along the bonding interface. Besides, in the experiment A1, a room temperature strength of 330 MPa and a high temperature strength of 300 MPa were attained. In this experiment, the fracture occurred along the bonding interface. In the experiment A3, the four point bending strength was improved. Moreover, the bonded article fractured along an interface other than the bonding interface and the strength was slightly smaller than that of the sintered sample, probably because of the growth of the ceramic particles in the sample itself.

In the experiment A4, the temperature of the heat treatment was 1800° C. and too low for the bonding. Moreover, when the thus produced bonded article was subjected to the subsequent machining process, the article was separated along the bonding interface and thus "–" was indicated in the column of "four point bending strength" in the Table. In the experiment A5, the condition of the bonding interface was good and a strength of 100 MPa was attained. However, because the sintering of the samples was further progressed, the room temperature strength of the article was degraded with respect to those in the experiment A1 to A3, and the four point bending strength at 600° C. may not be measured. In the experiment A6, a powder diffusion process was carried out and the samples were not be bonded.

[Experiment B]

This experiment was carried out as described in the experiment A. However, one sample to be bonded was made of silicon nitride and the other sample was made of aluminum nitride. The sample made of aluminum nitride was sintered at 1900° C. and the sample made of silicon nitride was sintered at 1850° C. Average surface roughnesses and flatnesses of the machined surfaces were made 0.1 μm. In Table 2, experiment B6, a powdery bonding aid made of yttrium oxide was applied between the surfaces. The results of the above measurements were shown in the Table 2.

Table 2

In the experiments B1, B2 and B3, the defects were not found along the bonding interface and the four point bending strength was excellent. Particularly, as shown in the experiment B3, when the samples were bonded at 1900° C., the strength at a room temperature was 400 MPa, which is substantially same as that of the original samples, and the high temperature strength at 600° C. was degraded by only 5% as compared to that of the sample. Moreover, the bonded article was not fractured along the bonding interface. Besides, in the experiments B1 and B2, a room temperature strength of 330 MPa and a high temperature strength of 300 MPa were attained.

In the experiment B4, the temperature of the heat treatment was 1700° C. which inadequate for producing the bonding. Moreover, when the thus produced article was subjected to the subsequent machining process, the article was separated. In the experiment B5, the temperature of the heat treatment was too high and especially in the sample made of silicon nitride, ingredients of the sample were vaporized to degrade the sample. In the experiment B6, the powder diffusion process was carried out. However, the assembly was heat treated at a high temperature of 1900° C. and the samples were not be bonded.

[Experiment C]

This experiment was carried out as described in the experiments A and B. However, both samples to be bonded were made of silicon nitride. This sample was sintered at 1850° C. A four point bending strength of the sample at a room temperature was about 900 MPa. Average surface roughnesses and flatnesses of the machined surfaces were made 0.1 μm. In Table 3, experiment C6, a powdery bonding aid made of yttrium oxide was applied between the surfaces. The results of the above measurements were shown in the Table 3.

TABLE 2

| | Substance between machined surfaces | Temperature of heat treatment (° C.) | Result of ultrasonic flaw detect test | Four point bending strength MPa room temperature | Four point bending strength MPa 600° C. | Position of the fracture |
|---|---|---|---|---|---|---|
| Experiment B1 | aqueous solution | 1800 | excellent | 330 | 300 | bonding interface |
| Experiment B2 | aqueous solution | 1850 | excellent | 330 | 300 | the other part |
| Experiment B3 | aqueous solution | 1900 | excellent | 400 | 380 | the other part |
| Experiment B4 | aqueous solution | 1700 | defective | — | — | — |
| Experiment B5 | aqueous solution | 2000 | defective | — | — | — |
| Experiment B6 | powdery bonding aid | 1900 | defective | — | — | — |

TABLE 3

| | Substance between machined surfaces | Temperature of heat treatment (° C.) | Result of ultrasonic flaw detect test | Four point bending strength MPa room temperature | Four point bending strength MPa 600° C. | Position of the fracture |
|---|---|---|---|---|---|---|
| Experiment C1 | aqueous solution | 1800 | excellent | 850 | 840 | bonding interface |
| Experiment C2 | aqueous solution | 1850 | excellent | 870 | 850 | the other part |
| Experiment C3 | aqueous solution | 1900 | excellent | 900 | 870 | the other part |
| Experiment C4 | aqueous solution | 1700 | defective | — | — | — |
| Experiment C5 | aqueous solution | 1950 | excellent | 300 | — | the other part |
| Experiment C6 | powdery bonding aid | 1850 | defective | — | — | — |

In the experiments C1, C2 and C3, the defects were not found along the bonding interface and the four point bending strength was considerably high. Particularly, as shown in the experiment C3, when the samples were bonded at 1900° C., the strength at a room temperature was 900 MPa, which is substantially same as that of the original sample, and the high temperature strength at 600° C. was 870 MPa. Besides, The bonded article was not fractured along the bonding interface. Moreover, in the experiment C1, a strength of 850 MPa was attained, however, the article was fractured along the bonding interface. In the experiment C2, a strength of 870 MPa was also attained and the degradation of the high temperature strength was hardly observed.

In the experiment C4, the temperature of the heat treatment was 1700° C. which was inadequate for producing the bonding. In the experiment C5, the condition of the bonding was good and a strength of 300 MPa was attained. However, sintering of the sample made of silicon nitride was progressed and the strength itself was lowered as compared to those of the experiments C1 to C3. In the experiment C6, the powder diffusion process was carried out and the samples were not bonded when the assembly was heat treated at 1850° C.

Figure 4:
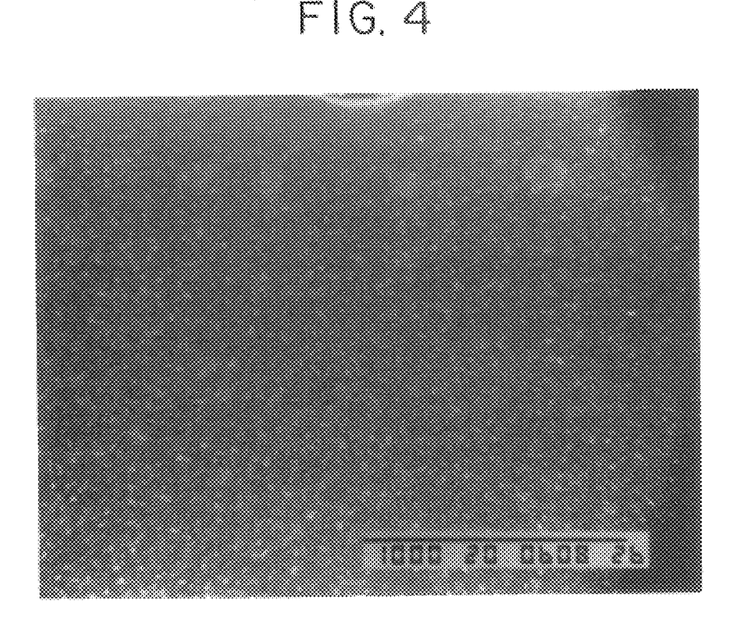
FIG. 4 is a photograph (an image of secondary electrons) of the ceramic microstructure of the bonded body taken by an electron microscope.

Then, in the experiment A2, the bonded article was cut into two pieces and the ceramic microstructure of the cut surface was photographed by an electron microscope and observed. FIG. 4 is a photograph of the ceramic microstructure taken as an image of secondary electrons by an electron microscope. The bonding interface exists in the central region of the photograph, however, such interface was not observable from the photograph.

Figure 5:
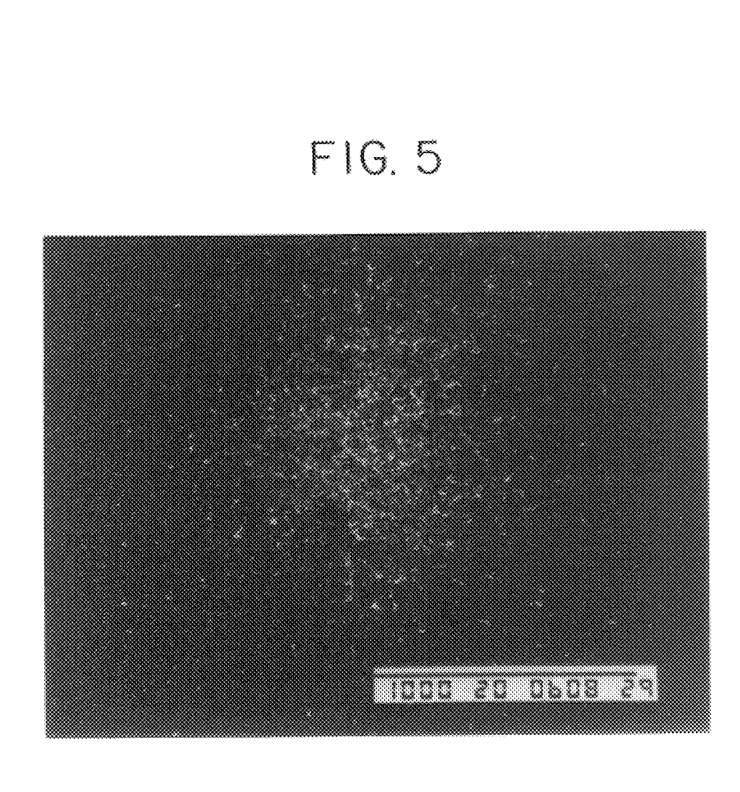
FIG. 5 is a photograph (an image of back scattered electrons) of the ceramic microstructure of the bonded body of FIG. 4 taken by an electron microscope.
Figure 6:
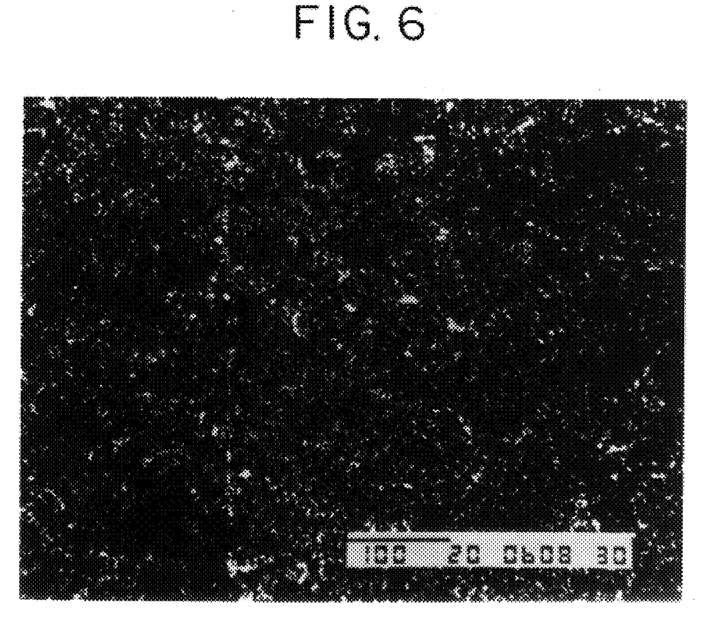
FIG. 6 is a photograph (an image of back scattered electrons) of the ceramic microstructure of the bonded body of FIG. 5 taken by an electron microscope, in which the central region is enlarged.
Figure 7:
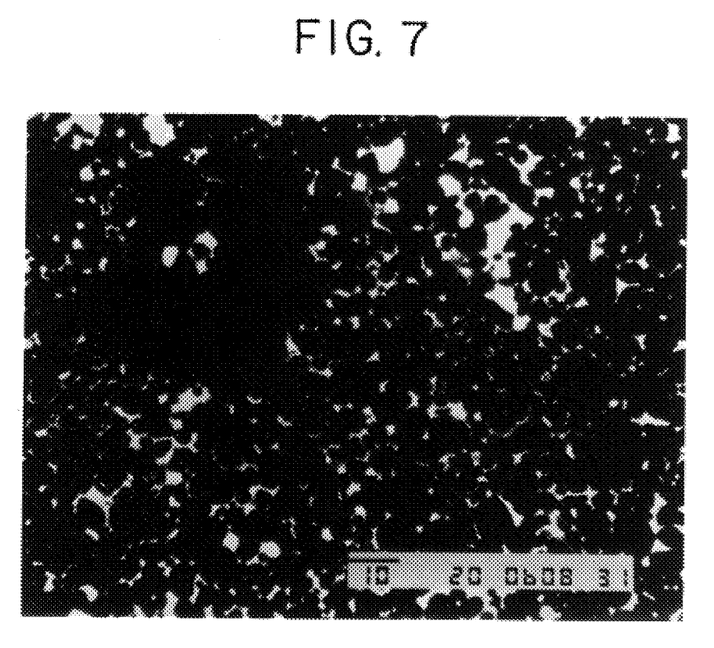
FIG. 7 is a photograph (an image of back scattered electrons) of the ceramic microstructure of the bonded body of FIG. 6 taken by an electron microscope, in which the central region is further enlarged.

FIG. 5 is a photograph of this ceramic micro-structure taken as an image of back scattered electrons by an electron microscope. Yttrium atoms were observed as white dots. The bonding interface or interface exists in the central region of the photograph and a white line was observed along the bonding interface. Such white line is considered as follows: The bonding aid was applied on the machined surface of each sample and after the heat treatment, the bonding aid was left along the bonding interface. Yttrium atoms in the bonding aid were considered to be shown as the white line. FIG. 6 is a photograph of the enlarged view of the ceramic microstructure of FIG. 5, which is taken as an image of the back scattered electrons by an electron microscope. In the left side of the central region of the photograph, the white dots indicating yttrium atoms were connected as a clear white line extending in the perpendicular direction. It is considered that yttrium atoms contained in the bonding aid are left along the bonding interface. FIG. 7 is a photograph of the enlarged view of the ceramic microstructure near the bonding interface shown in FIG. 6, which is taken as an image of the back scattered electrons.

The microstructure shown in FIGS. 5 to 7, especially shown in FIG. 7, consists of particles made of aluminum nitride and grain boundary containing yttrium. In FIG. 7, yttrium atoms were indicated as white dots. Metal elements other than yttrium hardly exist in the grain boundary. Particles colored with dark brown indicate particles of aluminum nitride. Black portions were found between the aluminum nitride particles. Such portions indicates open pores. When the microstructure was observed by an electron microscope, the surface of the cut article was ground and thus close pores within the article were converted to the open pores during the grinding process. FIG. 3 schematically shows the central region of lower left portion of the photograph in FIG. 7. As shown in FIGS. 3 and 7, the intergranular phases containing the bonding aid is moved and dispersed as the growth of the particles across the bonding interface.

[Experiment D]

This experiment was carried out as described in the experiment A. However, in the experiment A, the average surface roughnesses of the machined surfaces of the samples were made 0.2 μm and the flatnesses were made 0.5 μm, 1.0 μm or 2.0 μm. During the machining process, because the surface roughness of the machined surface was made 0.2 μm, the lower limit of the flatness was as a matter of course 0.2 μm. A solution of yttrium nitrate which was the same as used in the experiment A was applied on each machined surface to provide an assembly, which was then subjected to a heat treatment at 1900° C. for 1 hour. However, in each experiment, the samples were not similarly bonded as in the experiment A6.

The bonded article and the process according to the invention may be applied to a system for preventing the leakage of a corrosive gas or a gas for producing semiconductors. Especially, they may be applied for an apparatus exposed to a corrosive gas or a gas for producing semiconductors. In this case, one ceramic body may be a heating device comprising a metal member therein, heated by applying electric power, the other ceramic body may be a tube shaped body bonded to the heating device, and the metal member exposed to an inner space of the tube shaped body.

In this example, when the corrosive gas is a halogen corrosive gas containing halogen element, each ceramic body may preferably be made of aluminum nitride so that corrosion resistivity, especially for the halogen corrosive gas, of the heating device and the tube shaped body was considerably improved. However, it has been difficult to bond the bodies made of aluminum nitride because of the reason described in "Related Art Statement". The bodies may be bonded strongly according to the invention.

Figure 8:
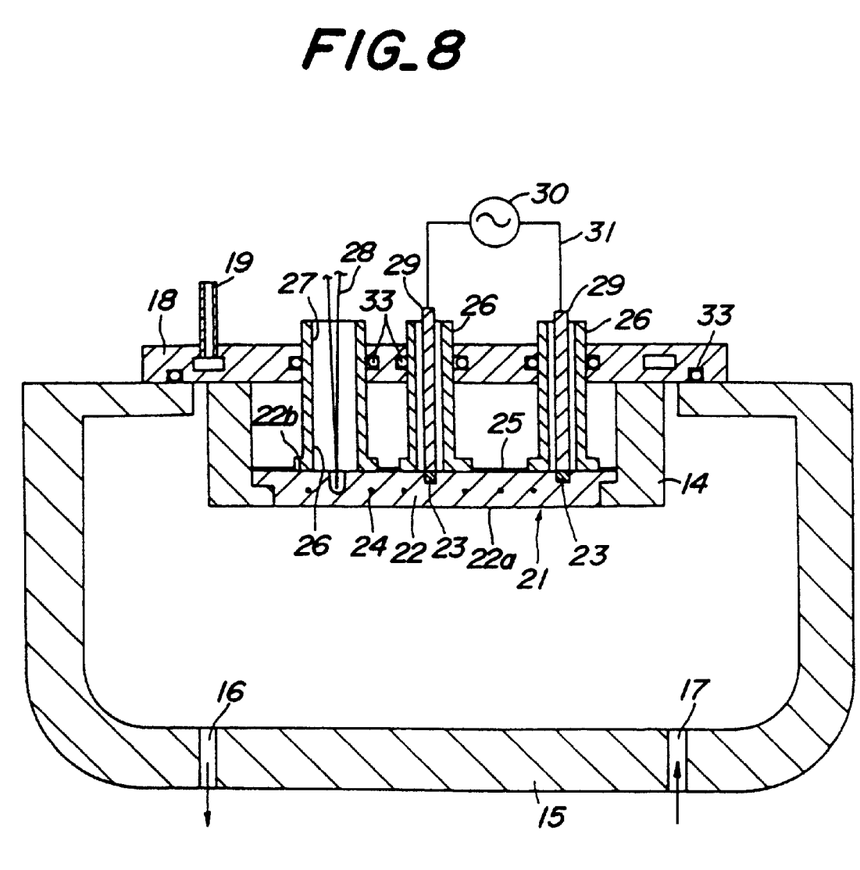
FIG. 8 is a cross sectional view schematically showing a heating apparatus, which is produced by bonding a ceramic heater 21 and a tube shape body 26, installed in a chamber 15 of an apparatus for producing semiconductors.
Figure 9:
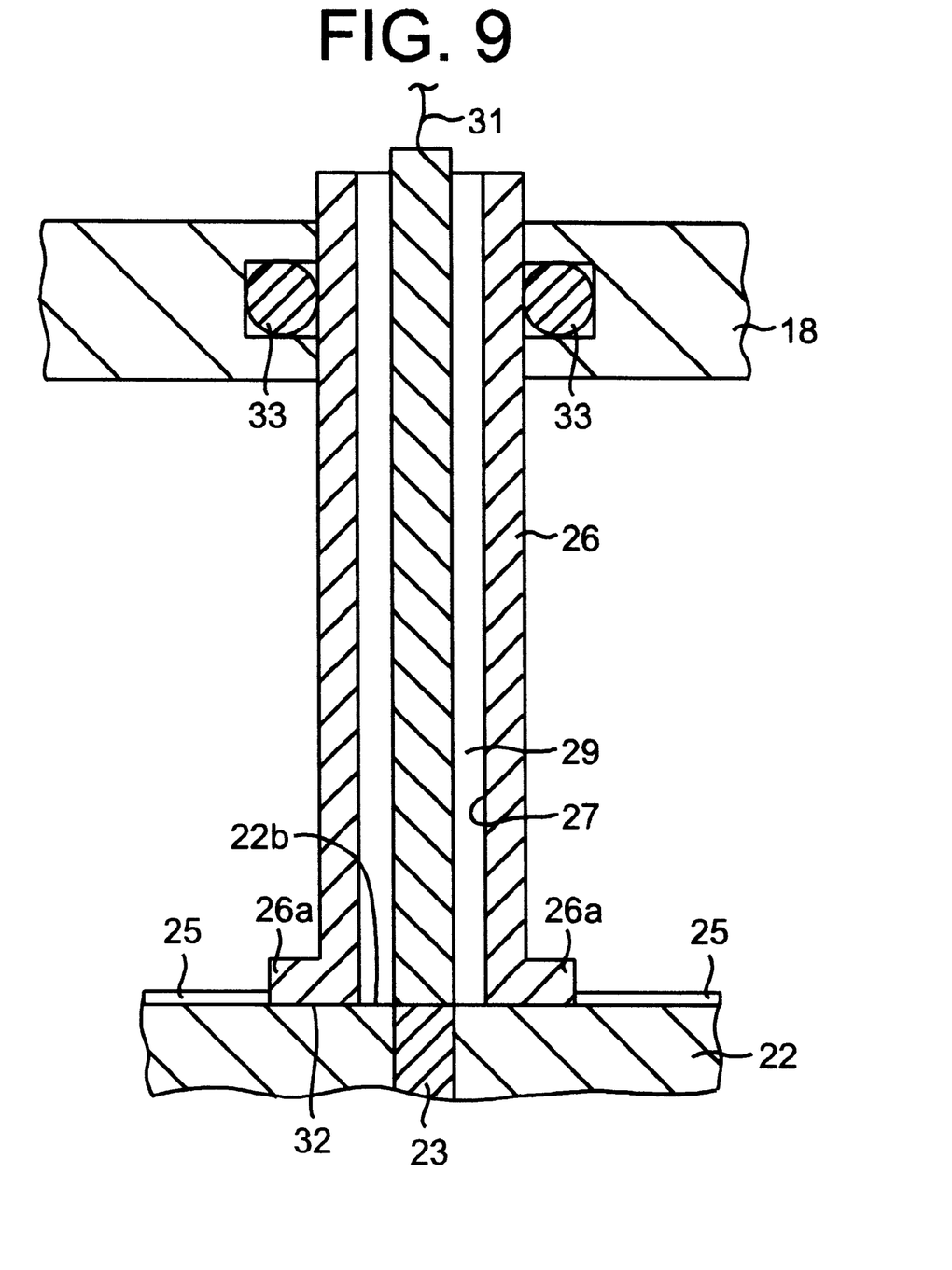
FIG. 9 is an enlarged cross sectional view of a region near the bonding interface of a base 22 and each tube shaped body 26 in the heating apparatus of FIG. 8.

FIG. 8 is a cross sectional view schematically showing the heating device installed in an apparatus for producing semiconductors and FIG. 9 is an enlarged view of the main portion of FIG. 8.

A case 14 is installed in a chamber 15 of an apparatus for producing semiconductors and a disk shaped ceramic heater 21 for heating the semiconductors is held by the case 14. A heating surface 22 of the heater 21 has a size large enough for setting a semiconductor wafer thereon. A corrosive gas or a gas for producing semiconductor films is supplied from a gas supplying hole 17 into the inner space of the chamber 15. Air in the inner space is discharged from a discharge hole 16 by means of a vacuum pump. In the ceramic heater 21, a heat resistor 24 is embedded within a disk shaped ceramic base 22 made of a densified and gas-tight material.

A pair of bulk terminals 23 is embedded on a back side surface 22 b of the base 22 and the bulk terminals 23 are electrically connected to the heat resistor 24. Ends of each of rod shaped electric suppliers 29 are electrically and mechanically connected to the bulk terminals 23, respectively. A lead wire 31 is electrically connected to another end of each electric supplier 29 and each lead wire 31 is connected to an alternating current electric supply 30. Electric power is supplied through each rod shaped supplier 29 to the heat resistor 24 to heat the ceramic heater 21 to a high temperature, such as maximum 1100° C. An upper side of the case 14 is covered by a flange 18 with a water cooling jacket 19, and the flange 18 and the wall of the chamber 15 are gas tightly sealed by means of an O-shaped ring 33. The flange 18 constitutes the upper side wall of the chamber 15. An edge portion of a thermocouple 28 with a sheath made of stainless steel is connected to the base 22.

A flange portion 26a is formed in the bottom portion of the tube shaped body 26 and bonded with the back side surface 22b of the heater. Therefore, the tube shaped body is bonded with the ceramic base 22 and unified. In the present example, three circular holes are formed in the flange portion 18 and each tube shaped body 26 is inserted through each circular hole. An upper side of the tube shaped body 26 is exposed to the atmosphere outside of the chamber. Therefore, each inner space of each tube shaped body 26 is filled with the atmosphere. The bottom portion of each tube shaped body 26 and the ceramic base 22 are gas tightly sealed. The tube shaped body 26 and the flange 18 are gas-tight sealed by the O-shaped ring 33 and electrically insulated.

Each electric supplier 29 is connected to the bulk terminal 23. The electric supplier 26 is fixed in the inner space of the tube shaped body 26. Additionally, in the present example, the thermocouple 28 is used as a device for measuring a temperature and the thermo-couple 28 is fixed in the inner space of the tube shaped body 26. Therefore, a pair of the electric suppliers 29, a pair of the bulk terminals 23, and the thermocouple 28 are exposed to the atmosphere outside of the chamber.

According to the heating apparatus, when a conductive film 25 is formed on the back side surface 22b by deposition, the thus formed deposition film 25 and the electric supplier 29 are electrically insulated by each tube shaped body 26. Therefore, it is possible to avoid the short circuit between the suppliers 29. Moreover, discharge or leak may be prevented between each electric supplier 29 and the chamber 15. Additionally, the electric suppliers 29 were not exposed to the inner space of the chamber, so that the corrosion of the suppliers 29 and the bulk terminals 23 and the contamination thereof may be prevented.

Besides, according to the inventor's study, the behaviour of g as molecules around the thermocouple is within the range of viscous flow from an atmospheric pressure to the vacuum condition of 1 torr. As the pressure is further lowered, the condition is converted to a range of molecular flow. Consequently, the condition of thermal transition around the thermocouple was considerably changed and accurate measurement of the temperatures by the thermocouple is made difficult. Moreover, in the viscous flow condition, when the pressure change is relatively large, existence of a deviation of the measured temperature is confirmed. On the contrary, according to the present example, the bonding region of the thermocouple 28 as the detector of the temperature and the base 22 are exposed to the atmosphere outside of the chamber, whose pressure does not change during the process for forming the semiconductor films. Therefore, the deviations according to the above change of the pressure may be prevented.

In the example, each tube shaped body and each base may preferably be made of silicon nitride or aluminum nitride. The heating apparatus may be produced by bonding each tube shaped body 26 and the base 22. That is, the ceramic heater 21 is produced by an ambient pressure sintering process or a hot press process. Prior to the processes, the bulk terminals 23 and the heat resistor 24 are embedded within a ceramic shaped body. Additionally, a cylindrical shaped body is produced by an injection molding process, an extrusion process, a press molding process or a hydrostatic pressing process, and then sintered at an atmospheric pressure to produce the tube shaped body 26. According to the invention, the tube shaped body 26 may be bonded to a predetermined position of the disk shaped ceramic base 22 maintaining the gas-tight performance.

Figure 10:
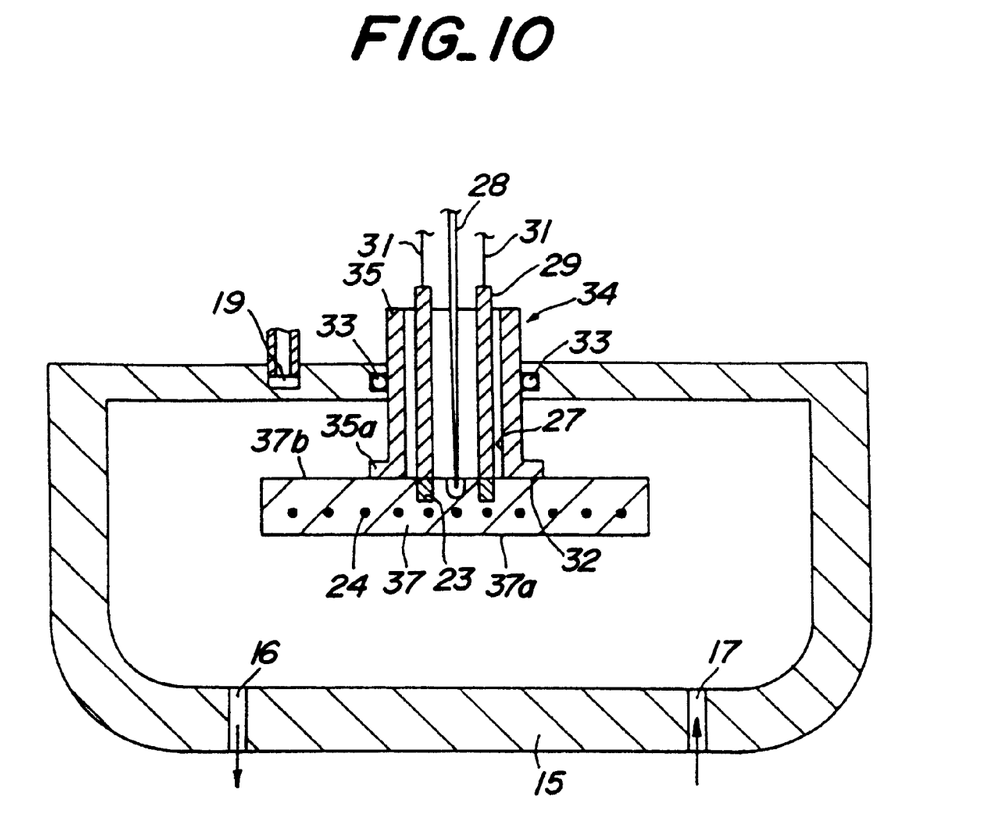
FIG. 10 is a cross sectional view schematically showing a heating apparatus, which is produced by bonding a ceramic heater and a tube shape body 34, installed in a chamber 15 of an apparatus for producing semiconductors.

Additionally, the invention may be applied for producing the other type of heating apparatus as described below. First, the heating apparatus will be explained referring to FIG. 10. In FIG. 10, the members already shown in FIG. 8 are indicated using the same numerals and the explanation will be omitted.

In the heating apparatus 34, the heat resistor 24 is embedded in a disk shaped base 37 and a wafer is set on a heating surface 37a. A tube shaped body 35 is bonded to a back side surface 37b of a base 37 maintaining gas-tight performance. The tube shaped body 35 and the chamber 15 are gas-tightly sealed through the O-shaped ring 33. A flange portion 35a is formed in the end portion of the tube shaped body 35 and a flange surface 32 of the flange portion 35a is bonded to the back side surface 37b. One end of the electric supplier 29 is connected to the terminal and one end of the thermo-couple 28 is bonded to the ceramic base 37. The electric suppliers 29, the thermocouple 28 and the terminals 23 are exposed to the outer space 27 of the chamber.

The tube shaped body 35 and the base 37 may preferably be made of silicon nitride and/or aluminum nitride as described above. When the flange surface 32 of the tube shaped portion 35 and the back side surface 37b of the base 37 are bonded, the process of the invention may be applied.

The heating apparatuses as shown in FIG. 8 and FIG. 9 are produced according to the above process. However, a wire made of molybdenum was used as the heat resistor 24. The heater 21 was made of aluminum nitride with a diameter of 235 mm by hot pressing at 1900° C. The tube shaped body 26 was made of aluminum nitride with an outer diameter of 60 mm, an inner diameter of 50 mm and a length of 20 mm by pressureless sintering at 1900° C.

Each surface to be bonded of the tube shaped body 26 and the base was machined by means of a surface grinder and a high speed lapping machine to produce the machined surface with an average surface roughness of 0.1 $\mu$m and a flatness of 0.1 $\mu$m. Aqueous solution of yttrium nitrate hydrate containing $2.61 \times 10^{-4}$ mol/cc of yttrium was applied on each machined surface to provide an assembly, which was then subjected to a heat treatment at 1900° C. During the heat treatment, the tube shaped body and the base were held and fixed in predetermined positions by a fixer so that the positions did not largely change during the treatment. During the bonding process, pressure or a load was not applied and their own loads were applied. Nitrogen gas was introduced as atmosphere during the heat treatment.

As a result, the tube shaped body 26 and the base 22 were strongly bonded and not separated. Moreover, a resistance of the heat resistor was increased by not more than about 20% during the treatment, which was practically admissible. Additionally, the thus produced heating apparatus was subjected to 400 heating cycles repeatedly. One heating cycle consists of one heating stage from a room temperature to 800° C. and one cooling stage from 800° C. to a room temperature. After the heating cycles were over, the resistance was increased by not more than 20%. Moreover, gas leakage from the bonding interface did not occur.

As the reference, the heater 21 was not bonded or subjected to the heat treatment, and subjected to the 400 heat cycles as described above. After the heating cycles were over, the resistance was increased by not more than 20%. As can be seen from the results, the heat treatment according to the invention did not substantially affect the property of the heat resistor.

As described above, according to the invention, a novel process for bonding ceramic bodies may be provided. Additionally, when bonding the ceramic bodies to produce a bonded article, a mechanical strength of the bonded article may be improved to a value higher than that of the bonded article produced by prior processes. Moreover, a mechanical strength at the bonding interface may be improved to a value comparable with or even higher than that at an interface other than the bonding interface.

The present invention has been explained referring to the preferred embodiments, however, the present invention is not limited to the illustrated embodiments which are given by way of examples only, and may be carried out in various modes without departing from the scope of the invention.

What is claimed is:

1. A process for producing a bonded article of ceramic bodies by a solid phase bonding process comprising steps of:

machining said ceramic bodies to be bonded to form machined surfaces with average surface roughnesses (Ra) of not more than 0.2 $\mu$m and flatnesses of not more than 0.2 $\mu$m;

applying a solution containing a bonding aid on at least one of said machined surfaces;

contacting said machined surfaces with each other to produce an assembly;

and subjecting said assembly to a heat treatment to produce said bonded article.

2. The process for producing a bonded article of ceramic bodies as claimed in claim 1, wherein said ceramic bodies to be bonded are machined to form said machined surfaces with average surface roughnesses (Ra) of not more than 0.1 $\mu$m and flatnesses of not more than 0.1 $\mu$m.

3. The process for producing a bonded article of ceramic bodies as claimed in claim 1, wherein said assembly is subjected to said heat treatment at a temperature not lower than a temperature at which ceramic particles in each of ceramic bodies may be grown, for growing said ceramic particles across a bonding interface of said ceramic bodies.

4. The process for producing a bonded article of ceramic bodies as claimed in claim 3, wherein said assembly is subjected to said heat treatment at a temperature not lower than (T−50° C.) when a sintering temperature of one of said ceramic bodies is taken as T° C.

5. The process for producing a bonded article of ceramic bodies as claimed in claim 4, wherein said assembly is subjected to said heat treatment at a temperature not higher than (T+50° C.) when a sintering temperature of one of said ceramic bodies is taken as T° C.

6. The process for producing a bonded article of ceramic bodies as claimed in claim 5, wherein said assembly is subjected to said heat treatment at a temperature not higher than said sintering temperature.

7. The process for producing a bonded article of ceramic bodies as claimed in claim 1, wherein said bonding aid is a sintering aid applicable to at least one of said ceramic bodies.

8. The process for producing a bonded article of ceramic bodies as claimed in claim 7, wherein said ceramic bodies comprise ceramic particles made of one or more material selected from a group consisting of aluminum nitride and silicon nitride, and said bonding aid is one or more bonding aid selected from the group consisting of a substance of yttrium-containing compound and a substance of ytterbium-containing compound.

9. The process for producing a bonded article of ceramic bodies as claimed in claim 8, wherein said bonding aid is selected from the group consisting of yttrium chloride, yttrium chloride hydrate, yttrium sulfate, and yttrium acetate.

10. The process for producing a bonded article of ceramic bodies as claimed in claim 1, wherein said solution is an aqueous solution.

11. The process for producing a bonded article of ceramic bodies as claimed in claim 1, wherein said solution is an ethyl alcohol solution.

12. The process for producing a bonded article of ceramic bodies as claimed in claim 8, wherein said solution is an aqueous solution.

13. The process for producing a bonded article of ceramic bodies as claimed in claim 8, wherein said solution is an ethyl alcohol solution.

14. The process for producing a bonded article of ceramic bodies as claimed in claim 9, wherein said solution is an aqueous solution.

15. The process for producing a bonded article of ceramic bodies as claimed in claim 9, wherein said solution is an ethyl alcohol solution.

* * * * *